(12) United States Patent
Dove et al.

(10) Patent No.: US 7,384,658 B2
(45) Date of Patent: *Jun. 10, 2008

(54) SEASONING RECOVERY AND RECYCLE

(75) Inventors: Kathryn Melissa Dove, Plano, TX (US); Joseph H. Gold, Dallas, TX (US); Ponnattu Kurian Joseph, Irving, TX (US); Ali Reza Peyrovi, Southlake, TX (US); Donald Joe Tatsch, Tioga, TX (US); Mehrnaz Vafaie, Plano, TX (US); Tim Wilding, Heage (GB)

(73) Assignee: Frito-Lay North America, Inc., Plano, TX (US)

( * ) Notice: Subject to any disclaimer, the term of this patent is extended or adjusted under 35 U.S.C. 154(b) by 416 days.

This patent is subject to a terminal disclaimer.

(21) Appl. No.: 11/225,229

(22) Filed: Sep. 13, 2005

(65) Prior Publication Data

US 2006/0016390 A1    Jan. 26, 2006

Related U.S. Application Data

(60) Division of application No. 10/889,823, filed on Jul. 13, 2004, now Pat. No. 6,962,128, which is a continuation-in-part of application No. 10/285,895, filed on Nov. 1, 2002, now Pat. No. 6,953,004.

(51) Int. Cl.
*A23G 3/20* (2006.01)
(52) U.S. Cl. .......... 426/289; 426/295; 118/13; 118/19; 118/600; 118/602; 118/308
(58) Field of Classification Search ........... 426/289, 426/295; 118/13, 19, 600, 602, 308
See application file for complete search history.

(56) References Cited

U.S. PATENT DOCUMENTS

| 2,893,332 | A |   | 7/1959  | Roser et al. |         |
|-----------|---|---|---------|--------------|---------|
| 3,152,010 | A |   | 10/1964 | Case         |         |
| 3,512,989 | A |   | 5/1970  | Smith        |         |
| 3,576,647 | A |   | 4/1971  | Liepa        |         |
| 3,608,474 | A |   | 9/1971  | Liepa        |         |
| 3,635,326 | A |   | 1/1972  | Linglinais   |         |
| 3,648,596 | A | * | 3/1972  | Zito         | 118/31  |
| 3,926,146 | A | * | 12/1975 | Breyer et al.| 118/24  |
| 4,270,486 | A |   | 6/1981  | Leverenz     |         |

(Continued)

OTHER PUBLICATIONS

Aerocon, Aeromechanical Conveying, printed from www.aeromechanical.com/aeromechanical.html on Jun. 28, 2004.

(Continued)

*Primary Examiner*—Carolyn Paden
(74) *Attorney, Agent, or Firm*—Colin P. Cahoon; Carstens & Cahoon, LLP

(57) ABSTRACT

Seasoning for use with snack chips can be recovered and recycled. A seasoning permeable conveyor transports snack chips through a seasoning application. The seasoning applicator deposits seasoning onto the snack chips. The conveyor allows the seasoning not adhered to the moving snack chips to substantially pass through and by toward a seasoning recoverer. The seasoning recoverer, which is positioned beneath the conveyor, collects the seasoning for purification and blending with fresh seasoning. After blending, the seasoning mixture is transported to the seasoning application for use.

11 Claims, 9 Drawing Sheets

U.S. PATENT DOCUMENTS

| | | | | |
|---|---|---|---|---|
| 4,419,953 | A | * 12/1983 | Fowler | 118/16 |
| 4,543,907 | A | 10/1985 | Fowler | |
| 4,576,108 | A | 3/1986 | Socola et al. | |
| 4,597,358 | A | 7/1986 | Aitken | |
| 4,614,162 | A | 9/1986 | Ryan et al. | |
| 4,741,460 | A | * 5/1988 | Blain et al. | 222/55 |
| 4,907,720 | A | * 3/1990 | Henson et al. | 222/55 |
| 4,936,489 | A | * 6/1990 | Blain et al. | 222/200 |
| 5,090,593 | A | 2/1992 | Ejike | |
| 5,386,939 | A | 2/1995 | Ruegg | |
| 5,707,448 | A | * 1/1998 | Cordera et al. | 118/13 |
| 5,846,324 | A | 12/1998 | Marshall et al. | |
| 6,953,004 | B2 | * 10/2005 | Dove et al. | 118/13 |
| 6,962,128 | B2 | * 11/2005 | Dove et al. | 118/13 |

OTHER PUBLICATIONS

Young Industries, Inc., Listing of Equipment Engineered and Manufactured by Young Industries, Inc., printed from www.younginds.com/ropes.html on Jun. 25, 2004.

Flexicon, Pneumatic Conveying Systems, printed from www.flexicon.com/us/Products/PneumaticConveyingSystems/index.asp on Jun. 28, 2004.

Kason, Welcome to Kason, Vibroscreen, printed from www.kason.com/Vibroscreen/index.php on Jun. 28, 2004.

Globalspec, Separators, Classifiers and Screeners, printed from www.globalspec.com/help/spechelp.html?name=Screener_Classifier_Separator&co... on Jun. 25, 2004.

Sweco, Round Screener, Sifters, Separators, printed from www.sweco.com/round.html on Jun. 25, 2004.

Sweco, Rectangular Screener, Sifters, Separators, printed from www.sweco.com/rect_round.html on Jun. 25, 2004.

Sweco, Products-Other Separation Equipment, printed from www.sweco.com/other_centrifugal.html on Jun. 28, 2004.

Prime Machinery Corporation, Screens: Rotary Sifter 12" X " C/S Kason KCN, printed from www.primemachinery.com/screens/12633.htm on Jun. 28, 2004.

Prime Machinery Corporation, Screens: Rotary Sifter 6" EPX AZO E650-C1, printed from www.primemachinery.com/screens/6102.htm on Jun. 28, 2004.

* cited by examiner

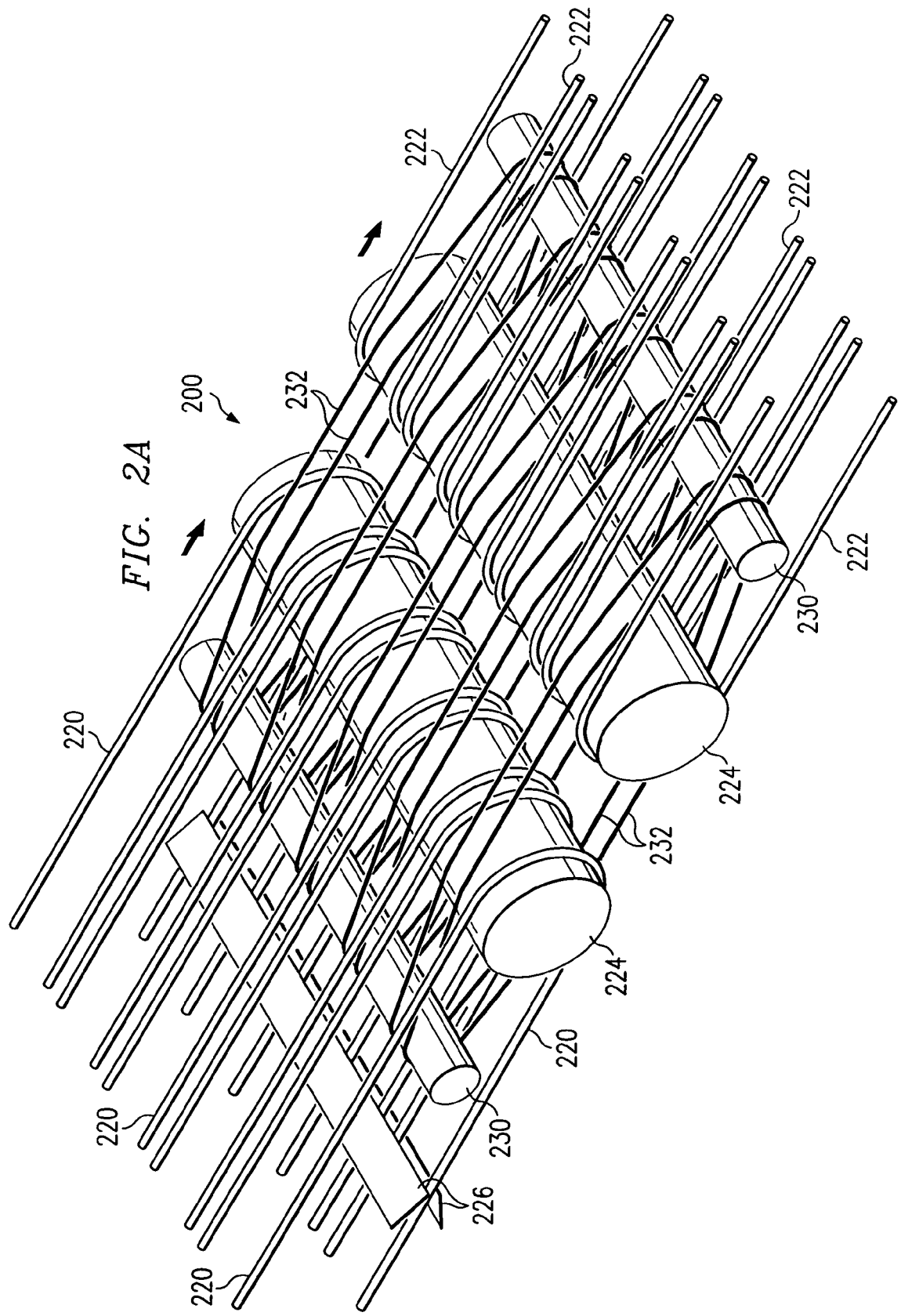

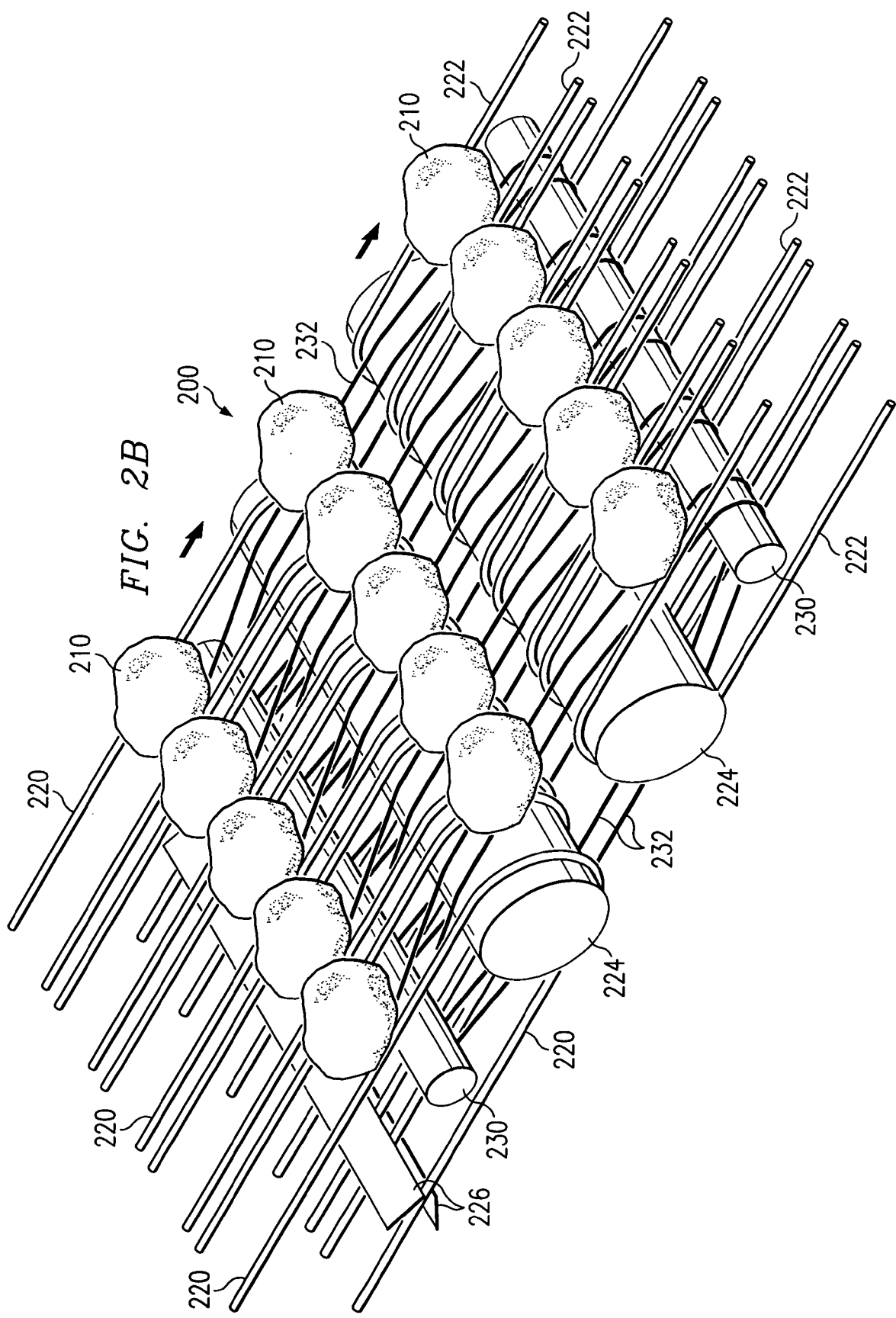

SEASONING RECOVERY AND RECYCLE

CROSS-REFERENCE TO RELATED APPLICATION

This application is a divisional of U.S. application Ser. No. 10/889,823 entitled "Seasoning Recovery And Recycle" filed on Jul. 13, 2004, now U.S. Pat. No. 6,962,128 which is a continuation-in-part of U.S. application Ser. No. 10/285,895 entitled "Seasoning Recovery And Recycle" and filed on Nov. 1, 2002, now U.S. Pat. No. 6,953,004.

BACKGROUND OF THE INVENTION

1. Technical Field

The present invention relates to an apparatus and process for recovering and recycling seasoning that is used to flavor snack food products. More particularly, the invention relates to an apparatus and process for recovering and recycling seasoning wherein the seasoning is recovered and purified so that it may be reapplied.

2. Description of Related Art

Snack food products, particularly seasoned snacks chips, are eaten and enjoyed by consumers. For example, potato chips, tortilla chips, corn chips, and the like often include one or more seasonings added to the snack chips after cooking but prior to packaging. To season, snack chips are typically seasoned by sprinkling one or more seasonings onto the surface of the chip products. The surfaces of the chips after seasoning provide a desirable and interesting appearance and immediate flavor to the palate upon consumption. Some common seasonings that consumers prefer, for example, include salt, barbecue flavor, sour cream and onion flavor, vinegar flavor, cheese, and others. Some of these seasonings are hygroscopic and readily absorb oil.

Seasoning is typically coated onto the surface of chips after cooking. Typically, this is advantageous in that after cooking, particularly with frying, the surface of the chips retain a surface coating of oil and are hot. When the powdered seasoning is deposited onto the exterior surface of the chips, a portion of the seasoning powder is retained.

Present techniques for distributing seasoning onto snack chips include tumbling the chips in a rotating cylindrical drum containing seasoning and sprinkling seasoning onto chips as they pass under a seasoning applicator. For example, with a rotating cylindrical drum, unseasoned snack chips enter the drum at an elevated end through a funnel. Seasoning is fed through a dispenser into an interior portion of the drum so as to coat the rotating chips. Internal baffles lift and tumble the chips to promote even coverage of seasoning as the chips are drawn toward the bottom of the drum via gravity. Thereafter, seasoned chips exit the drum and are packaged.

An alternative technique for applying seasoning to snack chips uses a conveyor. Snack chips after cooking are deposited onto a conveyor belt and are transported so as to pass beneath a seasoning applicator. As chips pass through a seasoning curtain, seasoning adheres to the surfaces of the chips that are exposed to the seasoning curtain. Seasoning that does not become affixed to chips is typically discarded because the seasoning, if reused, has adsorbed oil from coming in contact with the fried chips.

While devices such as a rotating drum are more efficient for seasoning, this is not practical for certain snack chip products. Particularly with the manufacture of uniformly shaped snack chips, randomizing seasoning techniques such as the rotating drum are impractical if packaging includes piling chips in a juxtaposed arrangement into a container. It is more efficient to leave chips in established rows and columns on a conveyor assembly. To rearrange the chips after tumbling in a drum would be expensive and inefficient.

These arrangements, and others, however, produce a significant amount of waste seasoning. Seasoning that does not adhere to surfaces of the chips cannot generally be reused. This is because the seasoning gets conglomerated with oil, moisture, and air from the processing of chips. This leads to changes in density of the seasoning, flowability, seasoning oxidation, and flavor reductions or alterations. Therefore, recycling of seasoning to date is difficult, expensive, and problematic. Also, exposure of the seasoning to the manufacturing process conditions increases the likelihood of microbiological growth.

Therefore, seasoning that does not adhere to snack chips is preferably collected and discarded. Some of the non-adhered seasoning, however, remains airborne in the form of dust, which has a tendency to drift throughout the manufacturing facility. This presents additional expenses in that this dust must be collected, these areas need to be cleaned more frequently, and additional ventilation and/or other safety devices must be utilized to reduce health risks.

Consequently, a need exists for a seasoning apparatus and process capable of applying seasoning onto snack products consistently and efficiently while keeping dust production to a minimum. This need is particularly apparent in seasoning applications where it is advantageous to have the chips remain on a conveyor in uniform rows and columns.

SUMMARY OF THE INVENTION

An exemplary embodiment of the invention is for a seasoning recovery and recycle apparatus and process. The apparatus and process includes elements and steps for reclaiming seasoning and for applying the reclaimed seasoning blended with fresh seasoning onto food products, such as snack chips in particular. Snack chips, preferably coming from a cooking area such as a fryer, are conveyed toward a seasoning application. The conveyor is pervious to seasoning so that seasoning that does not adhere onto moving chips passes, at least in part, through the conveyor. Preferably, the conveyor comprises a series of round cords that are disposed in parallel and operate concurrently. The conveyor can alternatively comprise another seasoning-pervious material or structure, such as chains or wire mesh. The cords comprise suitable material such as polyurethane or polyethylene. Each snack chip rests on at least two cords or chains, or a single cord or single chain with a saddle-like carrier. The cords (or chains) of each series operate so that between each set of cords at the conveyor's end, there is a smaller set of transfer cords interlaced therewith. The transfer cords allow the snack chips to transfer smoothly from one conveyor to the next.

The snack chips are then passed through a seasoning application for coating. Preferably, this coating occurs in a controlled environment to help preserve the quality and flowability of the seasoning, as well as the consistency of seasoning application. A seasoning applicator, such as a vibratory feeder, produces a curtain of seasoning from above the conveyor. The seasoning that is not adhered onto the snack chips passes through the conveyor for recovery.

Seasoning is recovered on a surface beneath the conveyor such as a vibratory shelf or rotating belt. The recovered seasoning is then delivered to a sifting device such as a rotary sifter or a vibratory sifter. Fresh seasoning is added to the system to replenish the adsorbed and/or discarded seasoning, preferably at the entrance of the sifter. The sifter blends and purifies the fresh and recovered seasoning to produce blended seasoning.

Blended seasoning is thereafter transported to the seasoning applicator for application onto snack chips. Preferably, the transport of blended seasoning preserves its physical properties without causing particle segregation. Suitable transport methods include but are not limited to aero-mechanical conveying, pneumatic dilute-phase transport, and pneumatic dense-phase transport. The seasoning flows from the applicator hoppers onto vibratory seasoning applicators. Thereby, blended seasoning can be applied onto a moving monolayer of snack chips efficiently and economically.

The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIGS. 2A and 2B are partial top perspective views of an embodiment of a chip conveyor assembly located prior to chip seasoning for use with the apparatus and method of FIG. 1 along line 2-2 showing chip transfer from one segment of the conveyor assembly to another, wherein FIGS. 2A shows the conveyor without snack chips and 2B shows the conveyor with snack chips;

DETAILED DESCRIPTION

A seasoning recovery and recycle apparatus and process in accordance with an exemplary embodiment of the invention generally reclaims seasoning that is not retained by snack chips. Further, the apparatus and procedure described herein is unlike others in that it can recover difficult seasonings that easily clumps or otherwise degrades. Commonly, snack chip products, such as potato chips, corn chips, tortilla chips, or the like, are seasoned with salt and other flavorings prior to being packaged for sale to consumers. With the apparatus and process described herein, the residual seasoning is collected and purified for reapplication onto snack chips.

Figure 1:
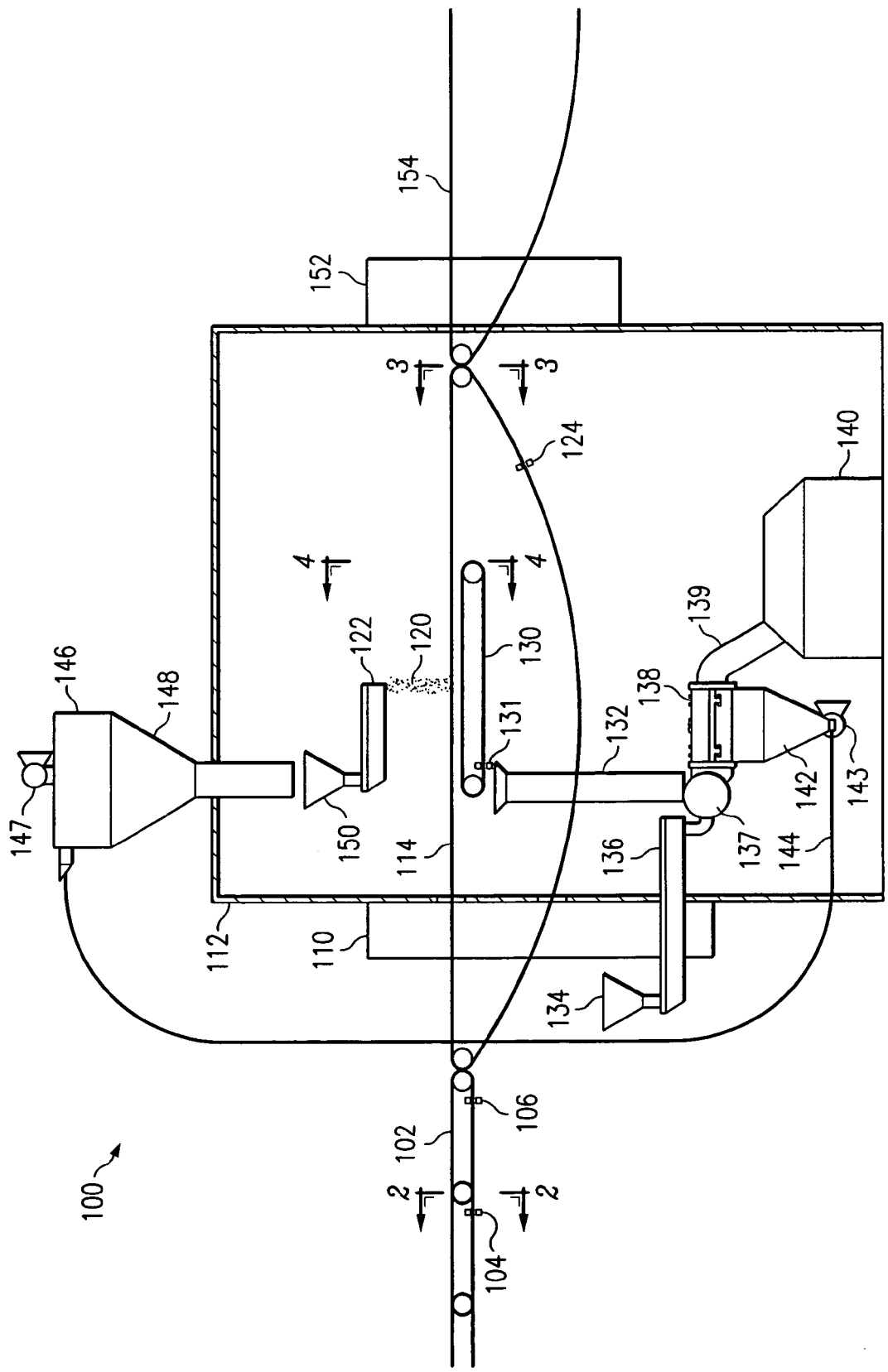
FIG. 1 is a schematic side elevational view of an apparatus and procedure for recovering and recycling seasoning in accordance with the invention.

FIG. 1 shows a schematic representation of the invention wherein applied seasoning that does not adhere to snack chips is reclaimed for reapplication. The seasoning system 100 shown comprises an example of an assembly for seasoning snack chips, particularly potato chips, having generally three sections. The first section is a pre-seasoning area where snack chips are transported from a cooking area toward the seasoning area. The second section is the seasoning area where seasoning is applied onto passing snack chips. Lastly, the third section is a post-seasoning area where seasoned snack chips are transported from the seasoning area toward product packaging.

In the depicted seasoning system 100, cooked snack chips are directed toward seasoning on a feeding conveyor 102. In a preferred embodiment, the feeding conveyor 102 is designed to minimize the feeding forward of any extraneous matter such as oil, broken chip pieces, or other undesired materials toward the seasoning area. This is particularly useful because reducing or eliminating extraneous matter from entering the seasoning area improves seasoning efficiency. Seasoning efficiency is the proportion of the amount of seasoning retained by snack chips leaving the system compared to the amount of fresh seasoning being added to the system.

The feeding conveyor 102 can be comprised of a series of individual cords, corded belts, or chains adjacently spaced laterally to each other. Alternatively, wire mesh can also be used. The cords can comprise any food-grade material that can withstand the tension requirements, support requirements, and operating conditions of the seasoning pervious conveyor, such as polyurethane, polyester, or a polymer and fiber composite. If chains are used, metal or plastic can be used, but stainless steel is preferable in food applications. Using a pervious construction is more preferable than standard belt conveyors because less seasoning is adsorbed on the seasoning pervious conveyor, which must later be removed. In addition, less oil is transferred from the chip cooking area to the seasoning system 100. As the chips leave the cooking area for subsequent seasoning, which is generally a fryer, oil remains on the chips and on the conveyor collecting the chips therefrom. Applying seasoning after cooking is advantageous because oil on the surface of chips helps retain seasoning. Furthermore, seasoning adhesion is improved at an elevated temperature that is within an optimal range wherein the seasoning adheres while not being degraded. As chips move away from the cooking area, oil on the chips is substantially adsorbed by the chips or dribbled off through open spaces between cords. Typically the cords are round so as to minimize the contact area of the conveyor with the chips. To further minimize oil transfer, optional conveyor wiping with, for example, stationary wipers such as squeegees 104 and 106 can be utilized to clean the cords of the feeding conveyor 102. Alternatively, seasoning scrapers with grooves that surround at least the bottom portion of the cords can also be used to remove seasoning. Such scrapers and/or squeegees can be positioned along the return path of the cords so that they do not impede the movement of the product conveyed above. Pre-seasoning transfer is further detailed in discussion of FIGS. 2A and 2B below.

Another advantage of the feeding conveyor 102 is that the snack chips are easily maintained in a uniform and monolayer arrangement. This also allows the chips to be evenly placed upon the conveyor 102 and, subsequently, evenly seasoned while maintaining a minimal void space between snack chips, preferably less than 50%. With a uniform and monolayer arrangement, snack chips that are substantially similarly shaped can be packaged in a container such as a cylinder with substantially each chip being seated against another.

Upon being conveyed to the seasoning area, snack chips are transferred from the feeding conveyor 102 to a seasoning pervious conveyor 114 (or "chip conveyor"). The seasoning conveyor 114 comprises a seasoning-pervious surface so that seasoning not adhered to a snack chip may pass through for recovery. Preferably, round corded belts similar to those of the feeding conveyor 102 are utilized for the seasoning pervious conveyor 114 and maintain the uniform and monolayer arrangement. As the snack chips enter the seasoning area, they pass through a front dust collector 110, which is a mode for preventing any airborne seasoning dust from escaping the seasoning control room 112 and spreading out into the production plant. Generally, the seasoning control room 112 has a lower pressure compared with the remainder of the facility, as this helps prevent airborne seasoning from spreading to other units. The seasoning control room 112 controls and regulates the temperature and humidity to minimize seasoning clustering. For example, in one embodiment, a desired control environment for conventional seasonings occurs with a temperature less than about 70° F. and with a relative humidity of less than about 30%. Seasonings, which are comprised, in part, of moisture sensitive substances such as salt, sugars, and others, are less likely to cluster together in lower humidity conditions. Note, however, that the total moisture content of the seasoning itself, although not as easily measured as humidity, is a better indicator of how the seasoning will behave.

Once in the seasoning control room 112, the snack chips are conveyed through a seasoning curtain 120. The seasoning curtain 120 is produced from a seasoning applicator 122 that is located above the seasoning pervious conveyor 114. The seasoning applicator 122 may comprise any mechanism for producing a steady and diffused stream of desired seasoning. One mechanism, for example, is one or more vibratory feeders whereby seasoning that is fed to each feeder is cascaded over snack chips passing beneath at a desired rate.

Seasoning that is not adhered onto moving snack chips passes through the seasoning pervious conveyor 114 and substantially accumulates upon a collecting apparatus such as a seasoning recovery belt 130. The seasoning recovery belt 130 is a belt of sufficient width for collecting a substantial portion of the unused seasoning from the seasoning curtain 120. As seasoning contacts the surface of the recovery belt 130, the seasoning comes to rest upon the moving surface. While the recovery belt 130 is shown as being essentially parallel to the top surface of the seasoning pervious conveyor 114, it should be understood that the recovery belt 130 may operate in an essentially perpendicular direction to that of the top surface of the seasoning pervious conveyor 114. Perpendicular operation allows for strategic placement and operation of the recovery belt 130 within the seasoning system 100. Hence, the snack chips upon the seasoning pervious conveyor 114 are transported beneath the seasoning applicator 122 and above the seasoning recovery belt 130. In the embodiment shown, the recovery belt 130 rotates in a countercurrent direction to the seasoning pervious conveyor 114, however, concurrent rotation may be used. The recovered seasoning is dropped from the edge of the recovery belt 130 into a recycle seasoning collector 132. Optionally, any seasoning remaining on the surface of the recovery belt 130 after the seasoning is unloaded into the collector 132 can be significantly removed from the recovery belt 130 with a stationary wiper such as a squeegee 131.

Figure 4:
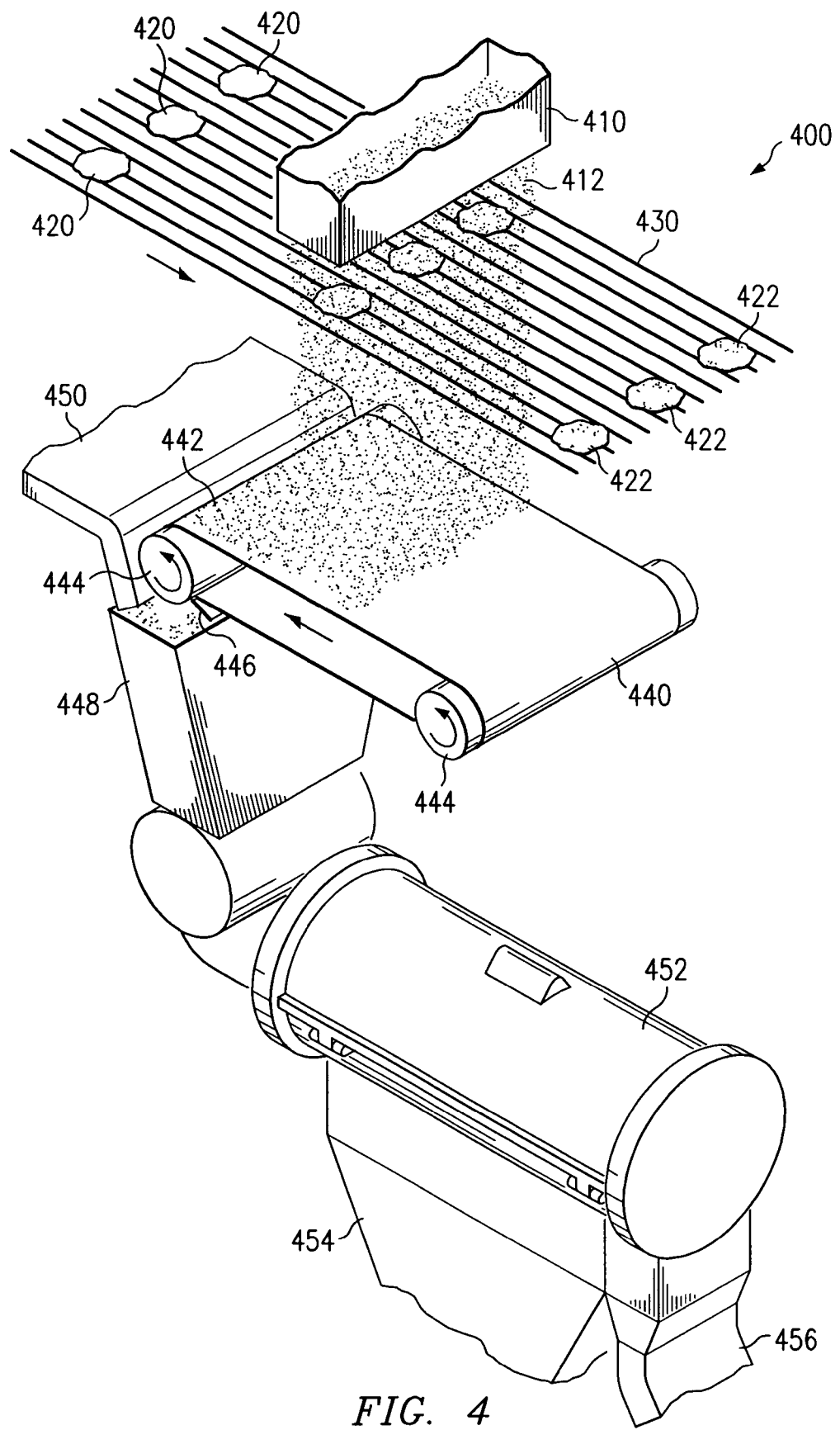
FIG. 4 is a schematic partial side elevational view of an embodiment of a chip seasoning assembly for use with the apparatus and method of FIG. 1 along line 4-4 showing seasoning application and recovery.

The reclaimed seasoning in the seasoning collector 132 is directed toward a sifter for purification 138. The sifter in the embodiments shown in FIG. 1 and FIG. 4 is a rotary/centrifugal sifter. However, other sifters can be used, such as vibratory sifters. As shown, the seasoning collector 132 is a funnel, but other transporting modes are possible, such as a vibratory feeder. Fresh seasoning from a fresh seasoning silo 134 is fed and directed with a vibratory feeder 136 toward the entrance 137 of the sifter 138. The reclaimed seasoning from the collector 132 is also supplied to the entrance 137.

The blend of fresh and reclaimed seasoning is then directed into the sifter 138. The sifter 138 substantially removes unacceptable seasoning elements such as clumps of seasoning, broken chip pieces, and other undesirable matter. Seasoning clumps are formed from seasoning particles coagulating from exposure primarily with moisture, oil, or both. The unacceptable matter is passed through the sifter 138 and out an exit 139. Therefrom, the unacceptable matter is collected in a waste repository 140. Acceptable seasoning is passed through the filtration media of the sifter 138 and is collected in a surge hopper 142. The seasoning collected in the hopper 142 is a mixture of fresh and recovered seasoning that is mixed and suitable for sprinkling upon unseasoned snack chips.

While purifying and mixing is accomplished with a rotary sifter 138 in the embodiment described herein, other techniques and similar devices may be substituted such as a vibratory planar screen, pan-type, or a round vibratory separator. Alternatively, or additionally, fresh seasoning may be introduced to the reclaimed seasoning after sifting, but additional blending may be required.

From the surge hopper 142, the blended seasoning is transported via a pneumatic dense phase system transfer 144. While pneumatic dense phase transfer is used in the embodiment shown in FIG. 1, other transport methods are possible, including but not limited to aero-mechanical conveying and pneumatic dilute-phase transfer. Referring back to FIG. 1, a dense phase system transfer pump 143 provides an air stream for transporting seasoning from the surge hopper 142 toward a vacuum receiver 146. Dense phase system transfer transport is relatively gentle and preserves the blended composition of the mixture of fresh and recovered seasoning. Additionally, where multi-component seasoning (comprised of seasonings having different densities and other differing physical properties) is used, such seasoning may suffer from particle segregation or degradation when transferred by other techniques, such as dilute phase conveying. Pneumatic dense phase conveying utilizes wavelike-flow or plug-flow in transporting product through piping. This preserves the blended seasoning's composition.

With pneumatic dense phase transport, vibratory feeders, and environmental control, the physical properties of the seasoning are desirably maintained. Particularly, smearing of the intrinsic solid oil fraction of the seasoning is deterred. If augers, screws, or the like were used in conveying or metering the seasoning, the seasoning would experience physical degradation. Note, however, that in many cases, especially where the seasoning is expensive, it is preferable to minimize the volume of the recycled seasoning transport system. In such cases, other forms of transfer requiring less volume may be preferred, such as aeromechanical conveying.

The blended seasoning is transported to the vacuum receiver 146 for separating air from the seasoning. As the blended seasoning is received by the vacuum receiver 146, air from the mixture is drawn away via a vacuum pump 147. The formerly-entrained seasoning is gently directed toward the vacuum receiver exit 148. From the vacuum receiver exit 148, the blended seasoning is directed toward the seasoning applicator hopper 150, which supplies blended seasoning to the seasoning applicator 122. While this embodiment is shown with only one seasoning applicator, chip conveyor 114, and seasoning recovery belt 130, this seasoning system 100 may be employed for handling the seasoning recovery and recycling for multiple assemblies.

Once seasoned, the snack chips exit the seasoning control room 112 after being transferred to a post-seasoning conveyor 154. Preferably, the seasoned snack chips exit the control room 112 by passing through a rear dust collector 152 similar to the front dust collector 110. Thereby, the likelihood of seasoning dust being released into other parts of the manufacturing facilities is reduced. After snack chips are transferred from the seasoning pervious conveyor 114, an optional set of stationary wipers such as squeegees 124 may be employed to remove any extraneous matter adhering to the cords of the seasoning pervious conveyor 114. Transport of the seasoned chips and cleaning of the cords after transfer is further detailed in discussion of FIG. 3 below. The post-seasoning conveyor 154, as with the other conveyors 102, 114, is preferably comprised of round cords so as to maintain the seasoned snack chips in a uniform and monolayer arrangement. Thereby, the seasoned snack chips are transported to a packaging area for placement in a container such as a cylinder.

FIGS. 2A and 2B show a portion of the feeding conveyor 102 from FIG. 1 along line II-II. As stated above, this conveyor is for snack chip transport from a cooking area to a seasoning area. FIG. 2A shows one embodiment of a suitable conveyor assembly 200 from a top perspective view. FIG. 2B shows the conveyor assembly 200 from a top perspective view with snack chips 210 being conveyed.

Pre-seasoned cooked snack chips 210 are conveyed on round cords 220. As the cords are round, the snack chips 210 maintain minimal contact with the surface of the cords 220. The snack chips 210 are supported and suspended between at least two cords of the conveyor assembly 200. To reduce unadsorbed oil transfer from, for example, a fryer of the cooking area, snack chips 210 are conveyed between at least two sets of cords shown here as cords 220 and 222. Cords 222 are of the same construction as cords 220. Rolls 224 are used to support both sets of cords 220 and 222.

To effect transfer of snack chips 210 from the cords of a first conveyor 220 to the cords of a second conveyor 222, transfer cords 232 are used. Preferably, the void area between snack chips 210 is reduced to minimize wasted seasoning. Transfer cords 232 are cords that are interlaced with and operate between the first and second conveyors 220, 222 that transport lanes of snack chips 210. In a preferred embodiment, at least two cords are configured to rotate between the first and second conveyors 220, 222. Transfer rollers 230 support and rotate the transfer cords 232. A front transfer roller 230 is positioned just prior/upstream to the rear roller 224 of the first conveyor 220. A rear transfer roller 230 is positioned just after the front roller 224 of the second conveyor 222. Generally, the transfer rollers 230 are smaller than the first- and second-conveyor rollers 224 and are positioned within the gap encircled between the upper and lower segments of the first and second conveyors 220, 222.

In operation, the transfer cords 232 rise up from the front transfer roller 230 to commence support of passing snack chips 210. The transfer cords 232 pass over the surfaces of the first- and second-conveyor rollers 224 and slant downward to the rear transfer roller 230. As they approach the rear roller 224 of the first conveyor 220, the snack chips are lifted by the transfer cords 232. The transfer cords 232 then convey the snack pieces until they begin to slant downward to the rear transfer roller 230, which deposits the snack chips 210 onto the second conveyor 222. Optionally, stationary wipers such as squeegees 226 may be used to remove any oil or other extraneous matter adhering to the cords of the conveyor assembly 200.

Figure 3:
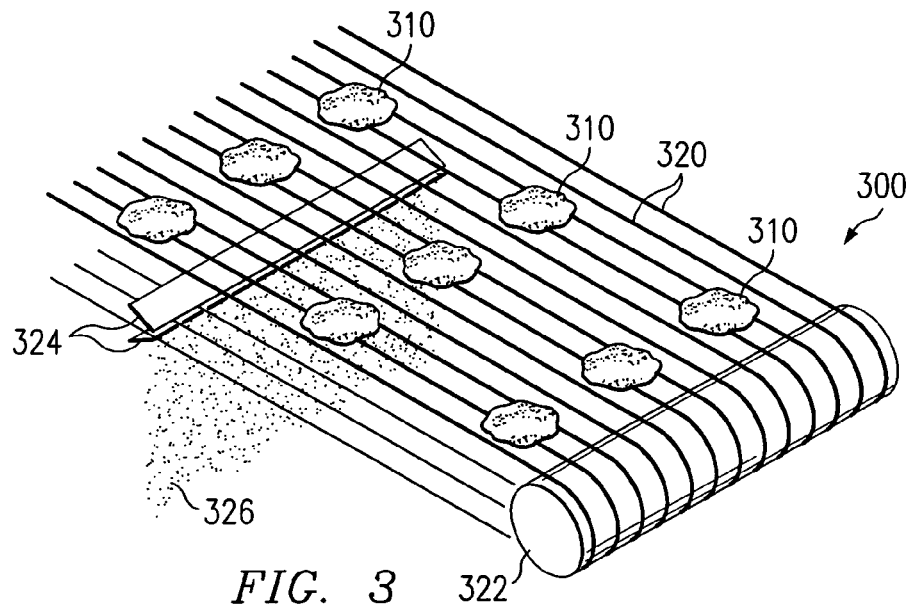
FIG. 3 is a partial side perspective view of an embodiment of a chip conveyor assembly located within the chip seasoning assembly for use with the apparatus and method of FIG. 1 along line 3-3.

FIG. 3 shows a portion of the seasoning pervious conveyor 114 from FIG. 1 along the line 3-3. Particularly, the seasoning conveyor assembly 300 shows seasoned snack chips 310 being transported after being seasoned toward packaging. Seasoned chips 310 are conveyed along round cords 320, which support the chips between at least two cords of the conveyor assembly 300. At about an end roller 322, seasoned chips 310 are transferred to another conveyor (not shown). Extraneous matter 326 such as seasoning, chip particles, or oil may be removed with a set of stationary wipers such as squeegees 324. Extraneous matter 326 may then be discarded or directed towards recycling.

FIG. 4 shows a portion of the seasoning application and recovery system from FIG. 1 along line 44. The portion of the seasoning applicator and recovery system 400 depicted in FIG. 4 shows blended seasoning, which is a mixture of fresh and recycled seasoning, being applied onto snack chips. Particularly, a seasoning applicator 410 produces a seasoning curtain 412. The seasoning curtain 412 is comprised of distributed seasoning particles falling from the applicator 410 toward a set of conveying cords 430, which are similar to the cords of the conveyors described above. The conveying cords 430 convey unseasoned snack chips 420 through the seasoning curtain 412, which transforms the snack chips 420 into seasoned snack chips 422.

The portion of the seasoning curtain 412 that is not adhered to the surface of the snack chips 420 or the conveying cords 430 is deposited upon a surface of a seasoning reclaim belt 440, which is supported by rollers 444. While the seasoning reclaim belt 440 is shown operating parallel to the conveying cords 430, the reclaim belt 440 may operate perpendicularly. Reclaimed seasoning 442 is conveyed to a rotary sifter 452. After reclaimed seasoning 442 is deposited into a sifter entrance 448, optional stationary wipers, such as a squeegee 446, assists in removing any seasoning adhering to the surface of reclaim belt 440 for directing into the entrance 448. Along with reclaimed seasoning 442, fresh seasoning from a fresh seasoning source 450 is introduced into the sifter entrance 448. Fresh seasoning is needed to provide a sufficient amount of seasoning for the seasoning curtain 412 and to enhance overall flavor qualities of the blended seasoning.

The mixture of fresh and reclaimed seasoning is directed from the sifter entrance 448 into and through a rotary sifter 452. The rotary sifter 452 is comprised of a rotating cylindrical screen (not shown) that uses centrifugal force to project acceptable and desirable seasoning therethrough to the blended seasoning exit 454. The seasoning and any other extraneous matter, which does not pass through the screen of the rotary sifter 452, is directed to a discards exit 456 for disposal. In addition to filtering, the rotary sifter 452 also mixes and blends the fresh and reclaimed seasonings together to form blended seasoning. The blended seasoning may then be transported toward the seasoning applicator 410. Additionally, other purification and blending techniques may be used, such as a vibratory separator or screen, in addition to or as a replacement for the rotary sifter 452.

Figure 5:
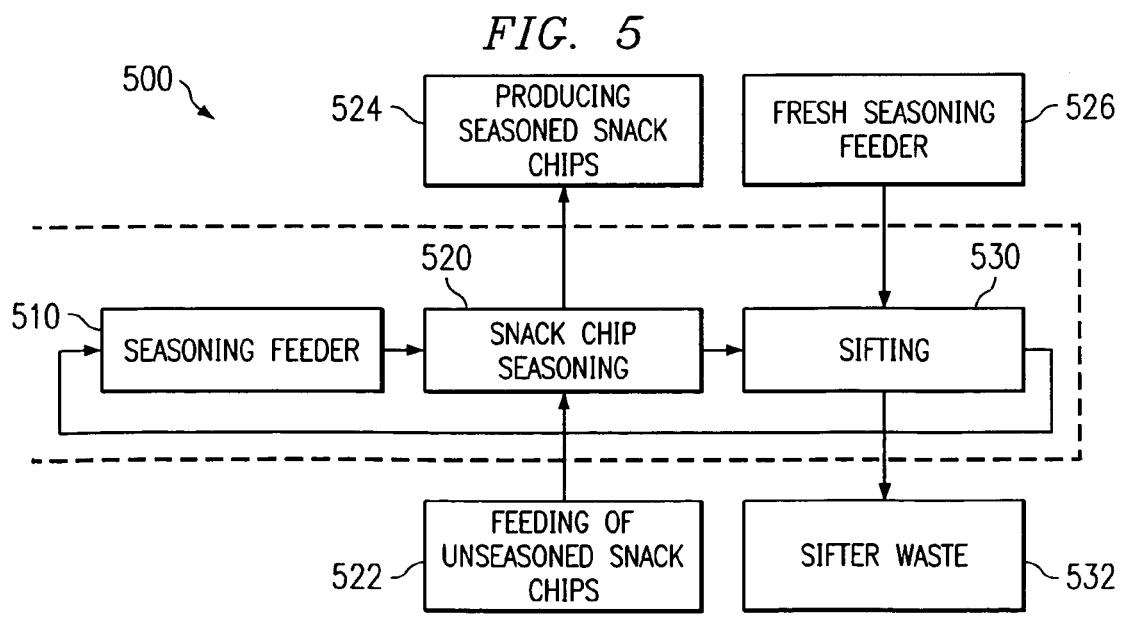
FIG. 5 is a schematic block diagram illustrating an exemplary process in accordance with the present invention for recovering and recycling seasoning.

FIG. 5 shows a schematic block diagram illustrating an exemplary process whereby seasoning for seasoning snack chips is recovered and recycled for reuse. The depicted process 500 provides seasoning from a seasoning feeder 510 to a snack-chip-seasoning step 520. Unseasoned snack chips from a feeding-of-unseasoned-snack-chips step 522 are seasoned in the snack-chip-seasoning step 520 to produce the seasoned snack chips in the producing-seasoned snack-chips step 524. Chip seasoning 520 provides seasoning to the producing-seasoned-snack-chips step 524 and to a sifting step 530. In addition to the reclaimed seasoning from the chip seasoning step 520, a fresh seasoning feeder 526 adds fresh seasoning to the mixture to be sifted in the sifting step 530. The fresh seasoning feeder 526 provides seasoning replenishment to the process 500. Acceptable and blended seasoning exits the sifting step 530 and is directed back to the seasoning feeder 510. Unacceptable seasoning and any other extraneous matter are sent to a sifter waste stage 532 to be discarded or processed.

FIGS. 6 through 11b illustrate another embodiment of a seasoning recovery and recycle system in accordance with the present invention. Unlike the embodiments shown in FIGS. 1 and 4, which utilize pneumatic dense phase transfer and rotary sifting of seasoning, the embodiments shown in FIGS. 6 through 11b utilize aeromechanical conveying and vibratory sifting. Furthermore, while environmental control over temperature and humidity were important in the previous embodiments to prevent seasoning degradation due to the relatively longer residence time, environmental control in these latter embodiments serves a different purpose—that of ensuring consistent flow behavior of the seasoning. In these latter embodiments, vacuum hoods are also strategically placed more closely to the sources of airborne seasoning to prevent environmental pollution.

Figure 6:
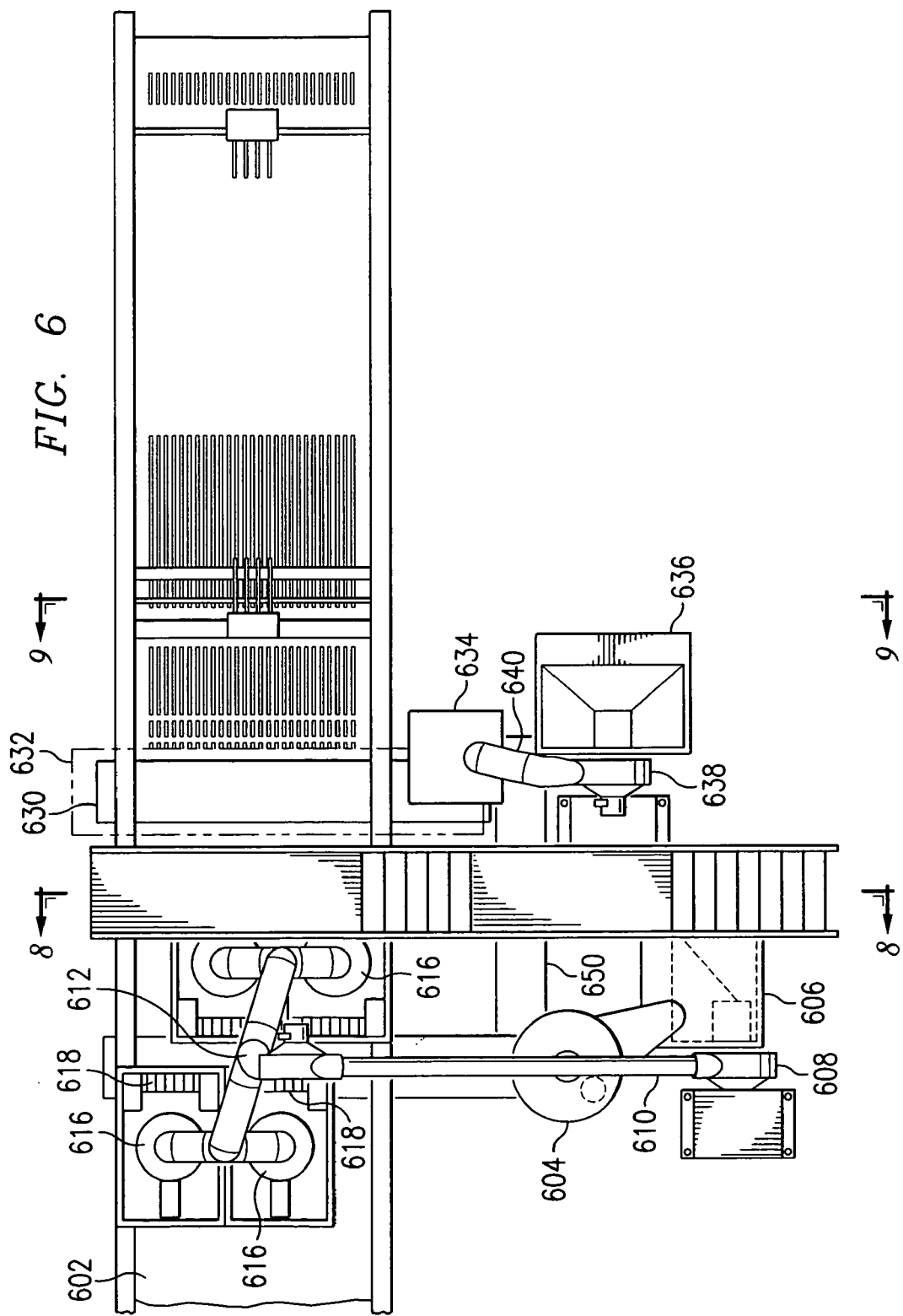
FIG. 6 is a top side elevational view of another embodiment of an apparatus for applying, recovering, and recycling seasoning in accordance with the present invention.
Figure 7:
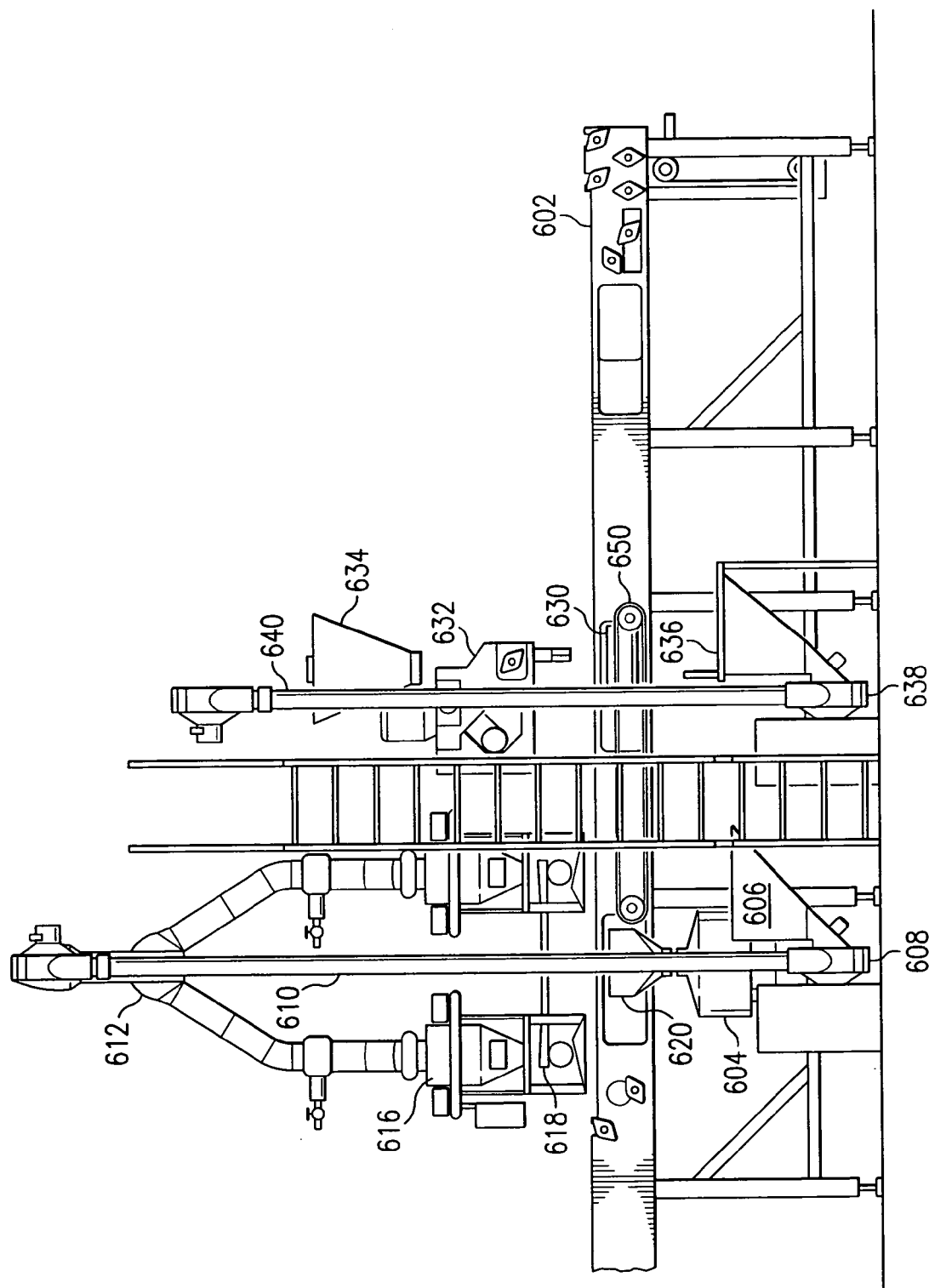
FIG. 7 is a side elevational view of the embodiment shown in FIG. 6.
Figure 8:
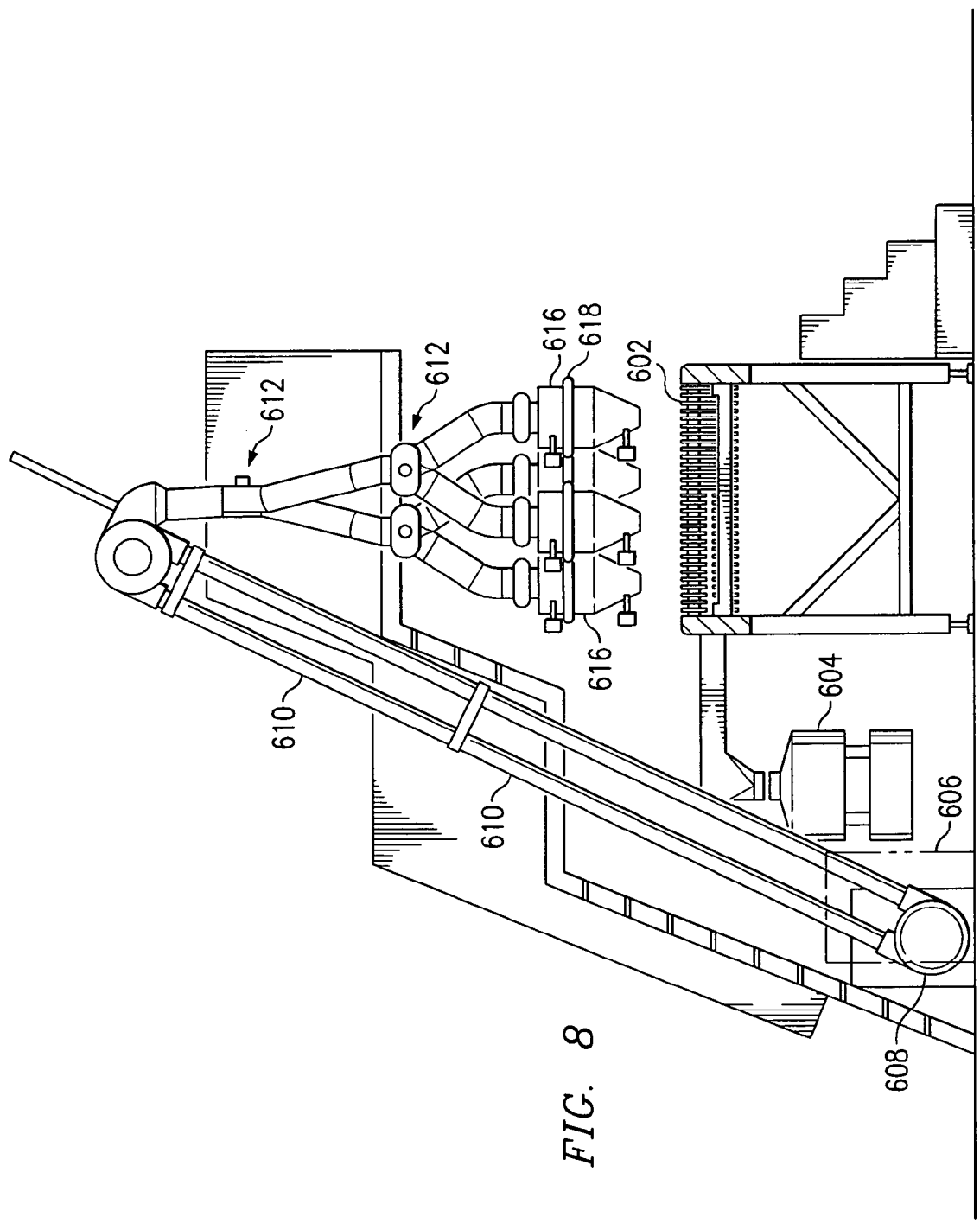
FIG. 8 is a cross-sectional view of the embodiment shown in FIG. 6 and taken at line VIII-VIII.
Figure 9:
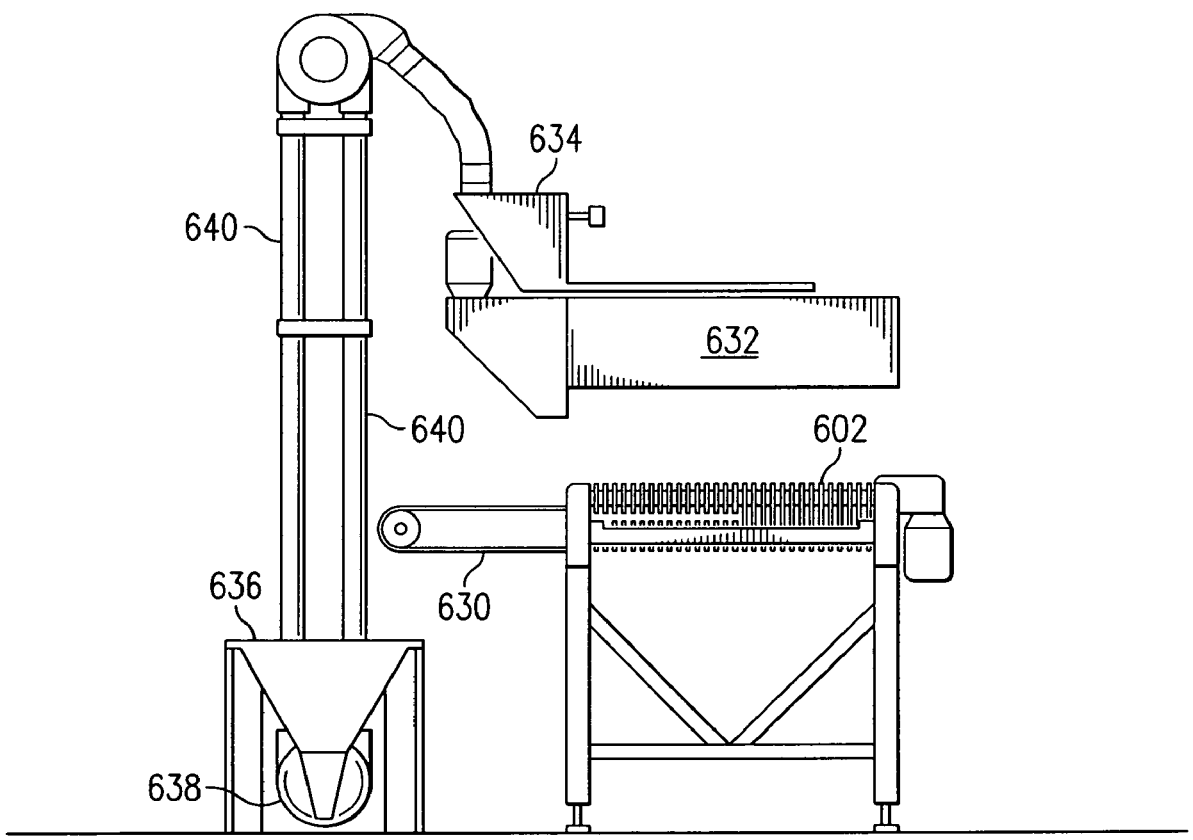
FIG. 9 is a cross-sectional view of the embodiment shown in FIG. 6 and taken at line IX-IX.

FIG. 6 is a top side elevational view depicting an apparatus for applying, recovering, and recycling seasoning in accordance with one embodiment of the present invention. FIG. 7 is a side elevational view of the embodiment shown in FIG. 6. FIG. 8 is a cross-sectional view of the embodiment shown in FIG. 6 and taken at line VIII-VIII. FIG. 9 is a cross-sectional view of the embodiment shown in FIG. 6 and taken at line IX-IX.

Referring to FIGS. 6 through 9, the snack products to be seasoned, such as potato chips, are conveyed on a seasoning pervious conveyor 602 from upstream to downstream, which is left to right in FIGS. 6 and 7. The seasoning pervious conveyor 602 is of similar construction to the seasoning pervious conveyor 114 shown in FIG. 1 and described above. In a preferred embodiment, the seasoning pervious conveyor 602 comprises corded polyester or polyurethane arranged in a seasoning-pervious fashion, although other food-grade, relatively non-elastic materials are also acceptable. The unseasoned product pieces pass under at least one primary seasoner 618, which preferably applies a curtain or other steady flow of seasoning onto the unseasoned products pieces. As discussed in more detail below, the primary seasoner(s) 618 preferably vibrate(s) so that seasoning is at least partially fluidized and easily and consistently flows off of the primary seasoner(s) 618. If desired, a secondary seasoner 632 or a plurality of secondary seasoners can be located downstream from the primary seasoner(s) 618 and above the seasoning pervious conveyor 602. A secondary seasoning stage 632 can be used to apply more of the same seasoning or a different seasoning to the product pieces. At the end of the seasoning pervious conveyor 602, the seasoned product pieces are transferred to the next downstream conveyor. The product transfer can be accomplished in any manner known in the prior art, or it can be accomplished with an interlaced transfer conveyor as described above with respect to FIGS. 2A and 2B.

Shifting perspectives from the path of product pieces to the path of seasoning, fresh seasoning first enters the system at the inlet of a sifter/separator 604. The fresh seasoning is preferably fed into the sifter/separator 604 along with recycled seasoning from a primary seasoning recovery conveyor 620 and possibly from a secondary recovery conveyor as well 630. These several streams can joined together before entering a single sifter inlet, or each stream can enter its own individual sifter inlet. The mixture of fresh and recycled/recovered seasoning is then sifted in a sifter/separator 604 to remove any undesirable or unusable clumps of oil and seasoning, as well as any other undesirable debris such as parts of product pieces. The sifter/separator 604 has at least two outlets, one for smaller particles and another for larger particles. Sifting is used to help break down lumps of seasoning before being transferred to the seasoning feeders of each seasoner 618. In a preferred embodiment, the separator 604 is a vibratory separator such as a Vibroscreen® circular, vibratory screen separator manufactured by the Kason Corporation, 67-71 East Willow St. Millburn, N.J. 07041-1416 USA. One advantage of vibratory screen separators over rotary sifters is that they require less volume to sift the same amount of seasoning. Furthermore, vibratory screen separators are much more efficient and cause less aeration of the seasoning. Other types of separators known in the art that do not cause significant particle degradation, however, can be also be used. In any case, the separator should be able to separate the incoming blend of fresh and recovered seasoning into at least two streams: a usable-stream and a non-usable-stream. A more advanced separator can also be used to isolate a certain size range of particles and discard all other particle sizes. For example, a multi-decked vibratory separator having a progression of sieve sizes can be used to separate several ranges of particle sizes. The desirably-sized particles can be directed to the seasoners 618 while the undesirably-sized particles are discarded or processed further.

From the separator 604, the usable seasoning is directed into a primary particle-transporting-conveyor feed hopper 606 (or "primary PTCF hopper"), which regulates the flow of seasoning feeding into a primary particle-transporting conveyor 610 (or "primary PT conveyor"). Note, however, that fresh seasoning alternatively can be fed directly into the primary PTCF hopper 606 rather than the separator 604. Next, the seasoning is fed from the PTCF hopper 606 into the primary PT conveyor 610, which is driven by a primary particle-transporting-conveyor drive 608 (or "primary PTC drive"). In a preferred embodiment, the primary PT conveyor 610 is an aeromechanical conveyor such as an Aerocon Aero-Conveyor manufactured by Aerocon (a VAC-U-MAX subsidiary), 69 William Street, Belleville, N.J. 07109. However, other types of enclosed or dust-tight mechanical conveyors can also be used to transport seasoning, so long as such conveyors do not degrade or separate seasoning particles to an undesirable extent. Other types of possible mechanical conveyors include but are not limited to tubular conveyors, screw conveyors, flexible screw conveyors, enclosed belt conveyors, enclosed drag conveyors, enclosed bucket conveyors, and dust-tight conveyors.

An aeromechanical conveyor, while often considered less gentle than pneumatic conveying, actually offers similar process effects—non-segregation and little or no degradation—as well as additional commercial benefits. An aeromechanical conveyor is less expensive, simpler, easier to clean and maintain, thus making it much more commercially feasible. In addition, an aeromechanical conveying system requires less system volume, offers a faster rate of seasoning turnover, and is therefore more resistant to fluctuations in the ambient conditions. Regarding system volume, aeromechanical conveying systems typically offer enclosed system volumes that are half of that required by corresponding pneumatic systems. In some cases, an aeromechanical system operates with as little as one-third the volume required by a corresponding pneumatic system. In contrast, a pneumatic system is generally very expensive, is difficult to clean, requires a much greater system volume, offers a lower seasoning turnover rate, and thus would be less economically feasible. In general, an aeromechanical conveyor comprises two or more connected tubes which house a continuous loop of cable. Mounted at relatively equal intervals along the cable are discs that are smaller than the inner diameter of the tubes. Two or more sprocket assemblies are used to link the tubes together to form an enclosed channel through which the cable can run. At least one of the sprocket assemblies provides the driving force necessary to move the cable and attached discs. An inlet and outlet is positioned where desired along the pathway of the aeromechanical conveyor. As the discs are pulled through the tube and sprocket assembly, the moving pockets of air between the discs fluidize the particulate feed entering the inlet such that the particles can be easily and gently conveyed.

Returning to FIGS. 6 through 9, the primary PTC drive 608 powers the primary PT conveyor (aeromechanical), which then moves the sifted seasoning towards the primary seasoners 618 in a fluidized fashion. In the depicted embodiment, there are four seasoners 618 positioned above the seasoning pervious conveyor 602 for applying seasoning, each seasoner 618 servicing one quarter of the width of the seasoning pervious conveyor 602. Other arrangements and numbers of seasoners, however, are acceptable, and the exact arrangement and number depends on the specific application. As the seasoning is conveyed towards the seasoners 618, the flow of seasoning is split into as many streams as there are seasoners—four streams in the embodiment shown. In a preferred embodiment, a diverter valve 612 having a sprocket-rotation sensor or flow-rate sensor diverts measured pulses of seasoning towards each seasoner 618. Such a diverter valve 612 coupled with a flow rate feed-back loop ensures that an equal or otherwise appropriate portion of the incoming seasoning is fed to each seasoner 618. However, other devices for dividing the flow of seasoning among all the seasoners are acceptable, such as Y-shaped tubing, etc. In the embodiment depicted, the flow is first divided into two streams, then each divided stream is further divided by diverters 612 into two streams so that each of the four seasoners 618 is individually fed. To reduce the effects of fluctuations and/or pulses of feed to each seasoner 618, each stream of seasoning collects in a primary seasoner surge hopper 616 before entering each seasoner 618.

A regulated flow of seasoning then drops from each surge hopper 616 onto the respective seasoner's feeder 618. While the seasoning feeder 618 can simply comprise a flat plate, flat tray, trough, or obvious variants thereof, it preferably comprises a vibratory tray with vertical guiding/dividing vanes that run parallel to the seasoning pervious conveyor. In embodiments where product pieces are conveyed in a plurality of lanes along the seasoning pervious conveyor 602, such as the one depicted, each vibratory tray's guiding/dividing vanes are preferably aligned with the lanes of product pieces such that each divided stream or curtain of seasoning falling from the vibratory tray falls directly upon a discrete lane of product pieces. In the embodiment shown, all four seasoning feeders 618 deposit seasoning along a single channel over the width of the seasoning pervious conveyor 602. This simplifies seasoning recovery and containment. The seasoners 618 may, however, be spaced apart if desired.

Any seasoning not adsorbed by the passing product pieces passes through the seasoning pervious conveyor 602 and is collected by a primary seasoning recovery conveyor 620. The recovery conveyor 620 is preferably a cloth-type-surfaced conveyor. Alternatively, other types of conveyors can be used to recover seasoning, such as a vibratory conveyor. A cloth-type-surfaced conveyor, however, is more preferable because it less complex, and allows seasoning to be easily transported uphill if necessary, and it does not require a minimum amount of entrained seasoning to operate properly, as is characteristic of vibratory conveyors. Although the seasoning recovery conveyor 620 is preferably perpendicular to the seasoning pervious conveyor 602, it need not be so and can instead be parallel to, or be at any other angle relative to, the seasoning pervious conveyor 602.

The recovered seasoning is conveyed along the recovery conveyor 620 into the sifter/separator 604 along with fresh seasoning for removal of undesirably-sized particles and debris. The seasoning process then repeats as described above.

In a preferred embodiment, vacuum hoods are strategically placed above the areas where seasoning is most likely to become airborne, such as the primary PTCF hopper 606, the seasoning application area, the recycle conveyor 620, and the entrance to the sifter/separator 604. The vacuumed seasoning is preferably discarded, as the formerly-airborne particles' small sizes would likely upset the desired particle-size distribution and/or simply become airborne again. The vacuumed seasoning, however, may be further processed as vacuumed particles are reprocessed in the prior art, if desired. Any such recaptured formerly-airborne seasoning may be reintroduced into the sifter 604 or directly into the primary PTCF hopper 606.

A suitable airborne-particle vacuum recovery system preferably comprises a hood substantially enclosing the entire primary seasoning recovery conveyor 620 and the immediate space surrounding the downward paths of seasoning from the seasoning feeders 618. The downward path of seasoning for each seasoning feeder 618 is essentially a vertical plane defined between the feeding end of the seasoning feeder 618 and the intersection of such plane with the recovery conveyor 620. Such a hood can be constructed, for example, from vertical sheets of poly (methyl-methacrylate) (also known as Lucite, Plexiglass®), acrylics, polycarbonate, glass, other plastic and/or metal rising up from all sides of the recovery conveyor 620 and terminating above the seasoners 618 to form a top-end enclosure. Slits and/or portals can be cut out of the vertical sheets to provide passages through which the seasoning pervious conveyor 602 and seasoning feeders 618 can pass. At the top of the hood is at least one vacuum opening connected to a vacuum source. The portion of the recovery conveyor 620 extending between the seasoning pervious conveyor 602 and the sifter/separator 604 can also be fully enclosed and made an extension of the vacuum hood. In operation, any airborne seasoning particles will rise up to the top of the vacuum hood and exit the vacuum opening. Suitable vacuum hood construction and vacuum sources are well-known in the prior art and need not be described in detail herein.

If desired, a second seasoning application and recovery unit can be located further downstream along the seasoning pervious conveyor. A second seasoning unit can apply a second coating of the same seasoning or apply a different seasoning, which may or may not be recycled along with the recovered seasoning from the first seasoning unit. In the embodiment shown in FIGS. 6 through 9, the second seasoning unit comprises: a secondary seasoner 632 positioned downstream from the primary seasoning unit and above the seasoning pervious conveyor 602; a secondary seasoning recovery conveyor 630 positioned below the seasoning pervious conveyor 602 and aligned beneath the secondary seasoner 632; a secondary PTCF hopper 636 located downstream from the primary seasoning unit; a secondary PT conveyor 640 having at least one secondary PT conveyor drive 638, wherein the secondary PT conveyor 640 is attached at one end to the secondary PTCF hopper 636; a secondary surge hopper 634 attached to the secondary seasoner 632 and located below the other end of the secondary PT conveyor 640; and, optionally, an intermediate seasoning transport conveyor 650 connecting the secondary recovery conveyor 630 to primary sifter/separator 604. The secondary seasoning unit is constructed and operated in the same manner as described above with respect to the primary seasoning unit.

Although the secondary seasoner 632 shown in FIG. 9 is a salting device, the secondary seasoner (if used at all) can alternatively comprise another seasoning unit such as the first seasoning unit described above, or any seasoning device known in the prior art. In embodiments where the secondary seasoner is a salter or a seasoning different from the first, an intermediate seasoning transport conveyor 650 is preferably not used and may simply not be present. Any recaptured salt or second seasoning may simply be discarded or may be processed through a recycle loop that is separate from the first recycle loop.

Temperature and humidity can be important conditions to control in embodiments having a relatively large system volume and lengthy seasoning residence times—such as in embodiments using pneumatic transfer—because the seasoning is given time to undesirably absorb moisture and degrade. While this is true, the volume and residence times are significantly reduced in the embodiment described with respect to FIGS. 6 through 9. Thus, the seasoning does not have a long residence time during which it may undesirably absorb moisture. However, the humidity and temperature of the surroundings can significantly affect the consistency with which the seasoning flows and is spread. Therefore the temperature and humidity are still preferably controlled, albeit for a different purpose. In fact, the seasoning flow behavior and coating behavior can be controlled by adjusting the ambient temperature and humidity in the seasoning area. The more humid the surroundings, the more erratic the seasoning application onto the product becomes, as the moisture increases the seasoning's tendency to clump together. Because changes in temperature affect the amount and rate of moisture adsorption by the seasoning particles, the temperature can also be adjusted to control the degree of clumping.

Typically, the controlling factor in seasoning application variability is the total moisture content of the air around the seasoning applicator, which is usually expressed in grains of water per pound of dry air (US units) or in grams of water per cubic meter (metric). The total moisture content of the air, however, depends on both the temperature and the relative humidity. A psychrometric chart can be used to relate total ambient moisture content to temperature and relative humidity. As can be seen using a psychrometric chart, any given total moisture concentration in air can be provided by different combinations of temperature and relative humidity.

Whereas seasoning-application-consistency experiments conducted within the range of 36-40 grains/lb produced seasoned product of desirable consistency, products seasoned at relatively high moisture levels, such as 100 grains/lb, had unacceptably low levels of seasoning consistency. Although the acceptable total moisture content will vary depending on the type of seasoning, the amount of consistency required, and the manner of seasoning application, the experiment results demonstrated that it is generally desirable to maintain ambient air moisture content at less than roughly 60 grains of water per pound of air. At 80° F., for example, this corresponds to 40% relative humidity. For even better seasoning application consistency, it is even more preferable to maintain ambient air moisture concentration at less than about 40 grains of water per pound of air. At 75° F., for example, 40 grains/lb corresponds to 30% relative humidity ("RH"). Of course, other combinations of temperature and humidity will provide the same moisture concentration. For example, 40 grains/lb also corresponds to 20% RH at 88° F., 10% RH at 110° F., and 50% RH at 61° F.

Note, however, that the ambient temperature and the seasoning residence time should be such that any dairy or fat components used in the seasoning material do not melt before application onto the food product. Generally, this requires that the ambient temperature be kept below the melting temperature of any dairy or fat components. If the seasoning enters the seasoning area with an initially lower temperature than the air around the seasoning apparatus, it is possible to maintain an ambient temperature higher than the melting point of the dairy or fat components as long as the seasoning is applied to the product surface before those components melt.

Many dairy and fat components used in seasoning materials have melting points within the range of about 80° F. to about 90° F. It is therefore preferable to maintain the ambient temperature in the seasoning area below 80° F. At 80° F., a preferable moisture concentration of 40 grains/lb corresponds to about 23% RH. Thus, at or slightly below about 80° F., the relative humidity is preferably maintained at 23% or lower.

The seasoning recovery and recycle apparatus and process results in an efficient and economical way to apply recovered seasoning, particularly to snack chips being conveyed in monolayer arrangement. Further, seasoning applied but not adhered to snack chips can be reused while maintaining the physical properties desired for seasoning such as flowability, particle size, flavor, and color while avoiding microbiological issues. Another advantage of the apparatus and process described herein is that residual oil and water transfer into the seasoning is minimized due to, at least in part, the corded conveyor system. Also, handling of the seasoning by the seasoning recovery and recycle apparatus is gentle, which helps preserve the quality of the recycled seasoning and avoids the creation of dust.

While the invention has been particularly shown and described with reference to a preferred embodiment, it will be understood by those skilled in the art that various changes in form and detail may be made therein without departing from the spirit and scope of the invention.

What is claimed is:

1. A method for applying a seasoning onto snack product pieces and reclaiming unadsorbed seasoning using a seasoning apparatus, said seasoning apparatus comprising a seasoning pervious conveyor, a seasoning feeder positioned directly above the seasoning pervious conveyor and having a feeding end, a seasoning recovery conveyor positioned below the seasoning pervious conveyor and aligned directly beneath the seasoning feeder, a sifter for receiving and purifying recovered seasoning from the seasoning recovery conveyor, and an enclosed mechanical particle-transporting conveyor running from the sifter to the seasoning feeder, said method comprising the steps of:
   a) conveying a plurality of unseasoned snack product pieces on the seasoning pervious conveyor;
   b) feeding a usable portion of seasoning from the particle-transporting conveyor, off of the seasoning feeder, and onto the unseasoned product pieces, thereby forming a plurality of seasoned product pieces;

c) receiving an unadsorbed fraction of seasoning on the seasoning recovery conveyor;

d) introducing fresh seasoning along with the unadsorbed fraction of seasoning from the seasoning recovery conveyor into the sifter;

e) sifting the fresh seasoning and the unadsorbed fraction of seasoning using the sifter to separate out an unusable portion of seasoning, thereby forming the usable portion of seasoning recited in step b); and f) conveying the usable portion of seasoning along the particle-transporting conveyor to the seasoning feeder.

2. The seasoning process of claim 1 wherein the seasoning recovery conveyor in step c) comprises cloth-type material.

3. The seasoning process of claim 1 wherein the conveying in step a) further comprises positioning the unseasoned snack product pieces in a monolayer arrangement on the seasoning pervious conveyor, and further wherein said seasoning pervious conveyor has multiple segments of round cords, each segment having at least two or more concurrent cords with an open space disposed between.

4. The seasoning process of claim 1 wherein the sifter used in the sifting of step e) is a vibratory screen sifter.

5. The seasoning process of claim 1 wherein the sifter used in the sifting of step e) is a round vibratory screen sifter.

6. The seasoning process of claim 1 wherein the particle-transporting conveyor used in the conveying of step f) is an aeromechanical conveyor.

7. The seasoning process of claim 6 wherein the method further comprises the step of adjusting at least one ambient condition such that the seasoned product pieces formed in step b) have a consistent distribution of seasoning on their surfaces.

8. The seasoning process of claim 7 wherein the at least one ambient condition adjusted is temperature.

9. The seasoning process of claim 7 wherein the at least one ambient condition adjusted is humidity.

10. The seasoning process of claim 1 further comprises the step of capturing an airborne fraction of seasoning using a vacuum hood.

11. The seasoning process of claim 10 wherein the vacuum hood substantially encloses a space immediately surrounding a vertical plane defined between the feeding end of the seasoning feeder and the seasoning recovery conveyor.

* * * * *